(12) United States Patent
Horie et al.

(10) Patent No.: US 6,849,014 B2
(45) Date of Patent: Feb. 1, 2005

(54) SLIDING CONTACT GUIDE FOR TRANSMISSION DEVICE

(75) Inventors: Hiroshi Horie, Osaka (JP); Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 113 days.

(21) Appl. No.: 10/347,655

(22) Filed: Jan. 21, 2003

(65) Prior Publication Data

US 2003/0144099 A1 Jul. 31, 2003

(30) Foreign Application Priority Data

Jan. 25, 2002 (JP) ........................................ 2002-016991

(51) Int. Cl.[7] .............................................. F16H 7/08
(52) U.S. Cl. ........................................ 474/111; 474/140
(58) Field of Search ............................ 474/109–11, 140

(56) References Cited

U.S. PATENT DOCUMENTS

| | | | |
|---|---|---|---|
| 6,322,471 B1 * | 11/2001 | Hashimoto | 474/140 |
| 6,645,102 B2 * | 11/2003 | Kumakura | 474/111 |
| 6,733,409 B2 * | 5/2004 | Konno | 474/111 |
| 6,743,130 B2 * | 6/2004 | Konno et al. | 474/111 |
| 2002/0132688 A1 | 9/2002 | Ono | |
| 2003/0064843 A1 * | 4/2003 | Konno | 474/140 |

FOREIGN PATENT DOCUMENTS

| | | | | |
|---|---|---|---|---|
| JP | (11-201246) A | * | 7/1999 | F16H/7/08 |
| JP | (2000-97300) A | * | 4/2000 | F16H/7/18 |
| JP | 3253951 | | 11/2001 | |
| JP | 2002-266958 | | 9/2002 | |

* cited by examiner

Primary Examiner—Marcus Charles
(74) Attorney, Agent, or Firm—Howson and Howson

(57) ABSTRACT

In a sliding contact guide for a chain, a guide body is composed of a shoe having a front surface on which the chain slides, and a plate-receiving portion provided on the back of the shoe. The shoe and plate-receiving portion are integrally molded from a synthetic resin. A reinforcing plate is inserted and fitted into a longitudinal slot in the plate-receiving and the sliding contact guide is attached to a frame by a pivot pin which extends through aligned mounting holes in the guide body and the reinforcing plate. Locking pieces formed in the plate-receiving portion, have tapered surfaces on their tips that engage locking holes in the plate and exert a biasing force on edges of the locking holes which urges the plate against the back of the shoe. The reinforcing plate and the guide body are reliably secured together and, even when the guide is vibrated, movement of the reinforcing plate in the slot of the guide body is prevented, so that low noise and long life are attained.

2 Claims, 4 Drawing Sheets

SLIDING CONTACT GUIDE FOR TRANSMISSION DEVICE

CROSS-REFERENCE TO RELATED APPLICATIONS

This application claims priority from Japanese application 016991/2002, filed Jan. 25, 2002.

FIELD OF THE INVENTION

This invention relates to a sliding contact guide for a power transmission utilizing an endless, circulating, flexible power transmission medium. It relates, for example, to a guide in a chain drive transmission, in which a chain transmits power from a driving sprocket to a driven sprocket, or to a guide in a belt drive transmission, in which a belt transmits power from a driving pulley to a driven pulley.

BACKGROUND OF THE INVENTION

In general, a chain or belt transmission device for valve timing in an internal combustion engine, or for transmitting rotational power in another drive mechanism, includes a chain, a belt, or other flexible power transmission medium. In the valve timing transmission, as shown in FIG. 7, a chain CH transmits power from a driving sprocket S1, or pulley, to one or more driven sprockets S2, or pulleys, The transmission typically includes a pivotally mounted, movable, sliding contact guide Ga, which cooperates with a tensioner T to maintain appropriate tension in the chain CH, and a fixed sliding contact guide Gb, which prevents widthwise vibration and widthwise movement of the chain or belt, causing it to run off the guides. The movable guide and the fixed guide are attached to a frame of the engine or other drive mechanism by suitable pins P, or by bolts or similar mountings.

FIG. 4 is an exploded elevational view of a plastic movable guide 300, designed to be used as tensioner lever in a chain transmission, and described in the specification of Japanese Patent Application No. 2000-382798. FIG. 5 is a plan view from the bottom side of FIG. 4, and FIG. 6 is a cross-sectional view taken on plane VI—VI in FIG. 4.

Guide 300 comprises a guide body 310, which including a shoe 310a, on the surface of which a transmission medium such as a traveling chain CH, a belt, or the like, is brought into sliding contact, and a plate-receiving portion 310b, provided on the back of the shoe 310a and extending along the longitudinal direction of the guide. The shoe and the plate-receiving portion are integrally molded as a unit from a synthetic resin. A reinforcing plate 320, composed of a rigid material, is fitted into a slot 310c in the plate-receiving portion of the guide body, for reinforcing the guide body. The opening of this slot faces away from the shoe, and the slot extends along the longitudinal direction of the guide, Adjacent one end of the plate-receiving portion 310b a mounting hole 310d is provided, for mounting the guide body on the frame of an engine or other machine. A mounting hole 320a is provided in the reinforcing plate 320 adjacent one end thereof, at a location such that, when the reinforcing plate is properly positioned in the slot of the guide body, the holes 310d and 320a are in register with each other so that they can receive a pivot means such as a mounting bolt or the like and be held together by the pivot means as well as pivoted thereon. The plate-receiving portion 310b also includes ribs 310f for enhancing the strength of the guide body 310.

As shown in FIG. 6, a locking piece 310e, formed on the guide body 310, is engageable with a locking hole 320b in the reinforcing plate 320, to prevent the reinforcing plate from being dislodged from the slot 310c.

Since the shoe 310a and the plate-receiving portion 310b are integrally molded as a unit from synthetic resin, the transmission medium slides on the guide body 310 itself, and it is not necessary to provide a separate shoe. Consequently, the number of the parts and the number of production steps are reduced. The reinforcing plate 320, fitted into the slot 310c, increases the strength of the guide in the pivoting direction. As a result the bending rigidity, toughness, and strength of the guide are significantly improved. Sliding plastic guides of this kind satisfy the recent demand for low cost and high reliability, and have come into widespread use.

Because the guide body bulges and shrinks with the changes in temperature encountered in an engine, these guides require a play or a gap G between the locking piece 310e and the locking hole 320b, as seen in FIG. 6. Because of this gap, vibration during engine operation causes reinforcing plate to move in the slot 310c, and the reinforcing plate and guide body collide with each other to generate noise. The surface of the slot also becomes worn. Thus, there has been a demand for further improvements in plate-reinforced plastic movable guides.

Accordingly, objects of the invention are to solve the above-mentioned problems encountered in the use of conventional sliding contact guides, to provide a sliding contact guide in which the reinforcing plate and the guide body are reliably secured together so that movement of the reinforcing plate in the slot of the guide body, does not generate noise due to vibration, and to reduce wear and thereby increase the useful life of the guide.

SUMMARY OF THE INVENTION

The sliding contact guide in accordance with the invention comprises an elongated, synthetic resin, guide body and a reinforcing plate. The guide body includes a shoe extending along the longitudinal direction of the guide body. The shoe has a front surface, arranged to contact a chain or other transmission medium, and a back side. A plate-receiving portion is provided on the back side of the shoe. The plate-receiving portion is integrally molded as a unit with the shoe, and extends along the longitudinal direction of the guide body. The plate-receiving portion has a face spaced from the shoe, and a slot in the plate-receiving portion extends along the longitudinal direction of the guide. The reinforcing plate is fitted into the slot. The slot has an opening in the face of the plate-receiving portion, facing away from the shoe, so that the reinforcing plate can be inserted into the slot in a direction of insertion transverse to the shoe.

The guide body has a mounting hole adjacent one end thereof, and the reinforcing plate has a hole adjacent one end thereof and in register with the mounting hole, so that the holes can receive a mounting pin and the guide body and reinforcing plate are held together in part by the engagement of the holes with the mounting pin.

A window is provided in the plate-receiving portion, and a locking piece is provided in the window. The locking piece extends in a direction from the face of the plate-receiving portion toward the shoe, and has a tip with a bulged portion entering the slot. A tapered surface is formed on the bulged portion.

A locking hole is provided in the reinforcing plate, and the reinforcing plate is locked to the guide body by engagement of the tapered surface of the bulged portion with an edge of the locking hole, the tapered surface exerting a biasing force on the edge of the locking hole, urging the reinforcing plate against the back side of the shoe.

The invention is applicable to various guides, including movable guides which cooperate with a tensioner to apply appropriate tension to a transmission medium while also preventing widthwise vibration and widthwise movement of the transmission medium off the guide, and also fixed guides which limit the traveling path of a circulating transmission medium.

The materials of the synthetic resin guide body are not especially limited. However, since the sliding surface in contact with a chain, belt or the like functions as a shoe, polyamide type resins having excellent wear properties and lubricating properties, i.e., engineering plastics, are preferable. Suitable polyamide type resins include nylon 6, nylon 66, and all aromatic nylons. Further, for improved toughness, strength and the like, fiber-reinforced plastics may be used, including fiber-reinforced polyamide resins.

The materials of the reinforcing plates must have sufficient bending rigidity and strength for use in a sliding contact guide, but are not especially limited. Iron-based metal, nonferrous metal such as aluminum, magnesium, titanium or the like, engineering plastics such as polyamide resins or the like, and fiber-reinforced plastics or the like are preferable.

Because the tapered surface of the bulged portion on the tip of the locking piece an edge of the locking hole, biasing the reinforcing plate into engagement with the back of the shoe by the resilient restoring force of the locking piece, the reinforcing plate is always reliably held securely in the slot and relative movement of the reinforcing plate and the guide body is prevented.

DETAILED DESCRIPTION OF THE PREFERRED EMBODIMENTS

Figure 1:
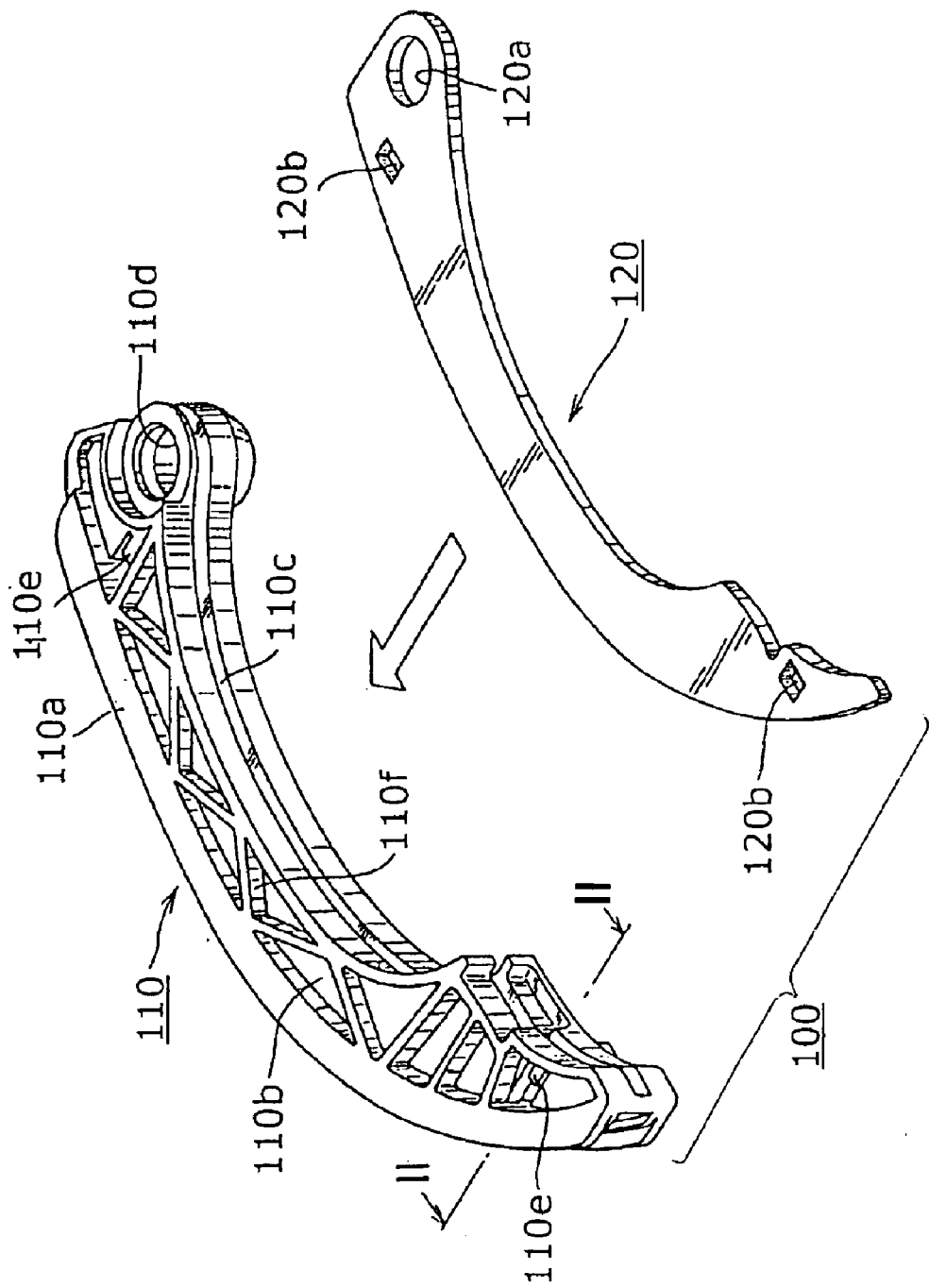
FIG. 1 is an exploded perspective view showing of a sliding contact guide according to the invention.
Figure 2:
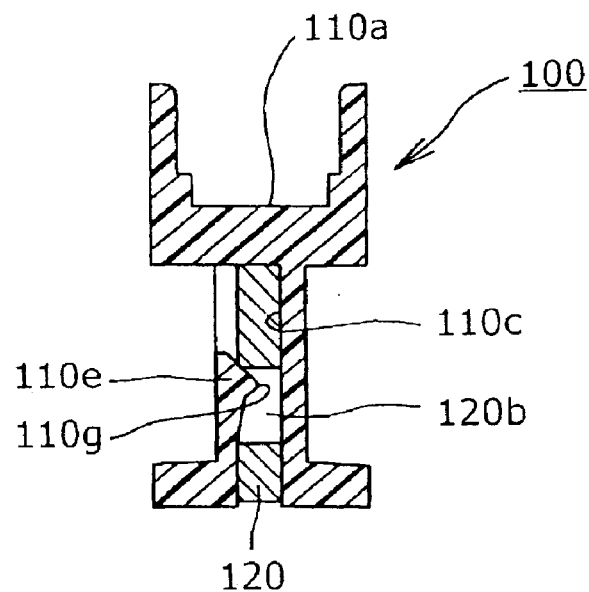
FIG. 2 is a cross-sectional view taken on plane II—II in FIG. 1.
Figure 3:
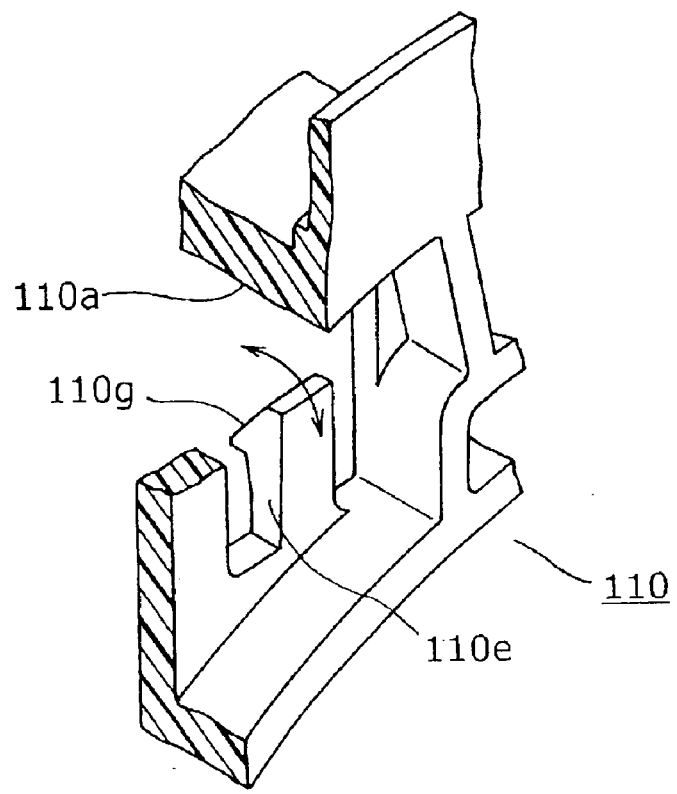
FIG. 3 is fragmentary perspective view showing the locking piece of the guide of FIG. 1.
Figure 4:
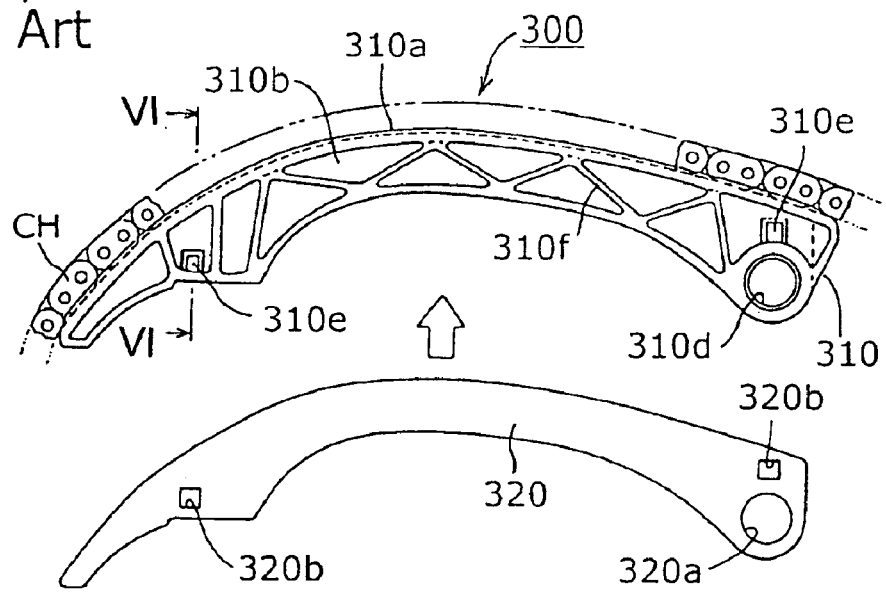
FIG. 4 is an exploded elevational view of a conventional sliding contact guide.
Figure 5:
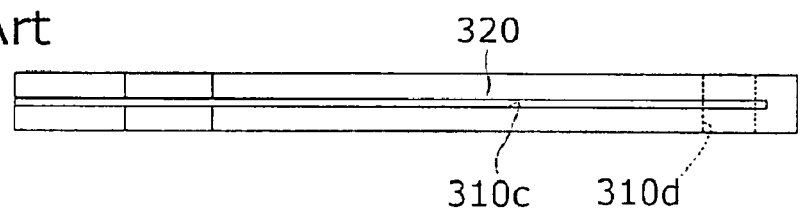
FIG. 5 is a plan view of the bottom side of the guide of FIG. 4.
Figure 6:
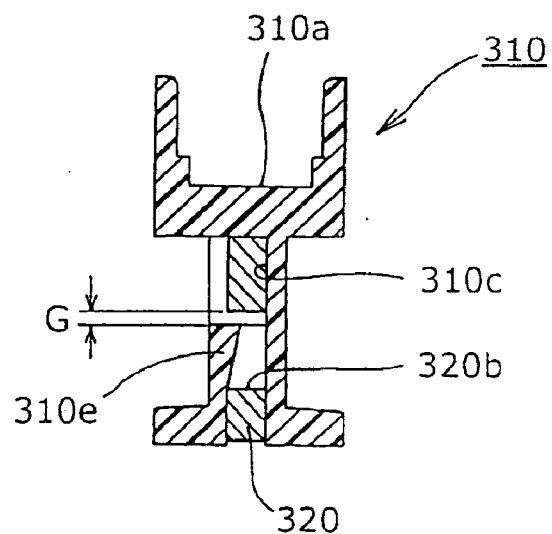
FIG. 6 is a cross-sectional view taken on plane VI—VI in FIG. 4.
Figure 7:
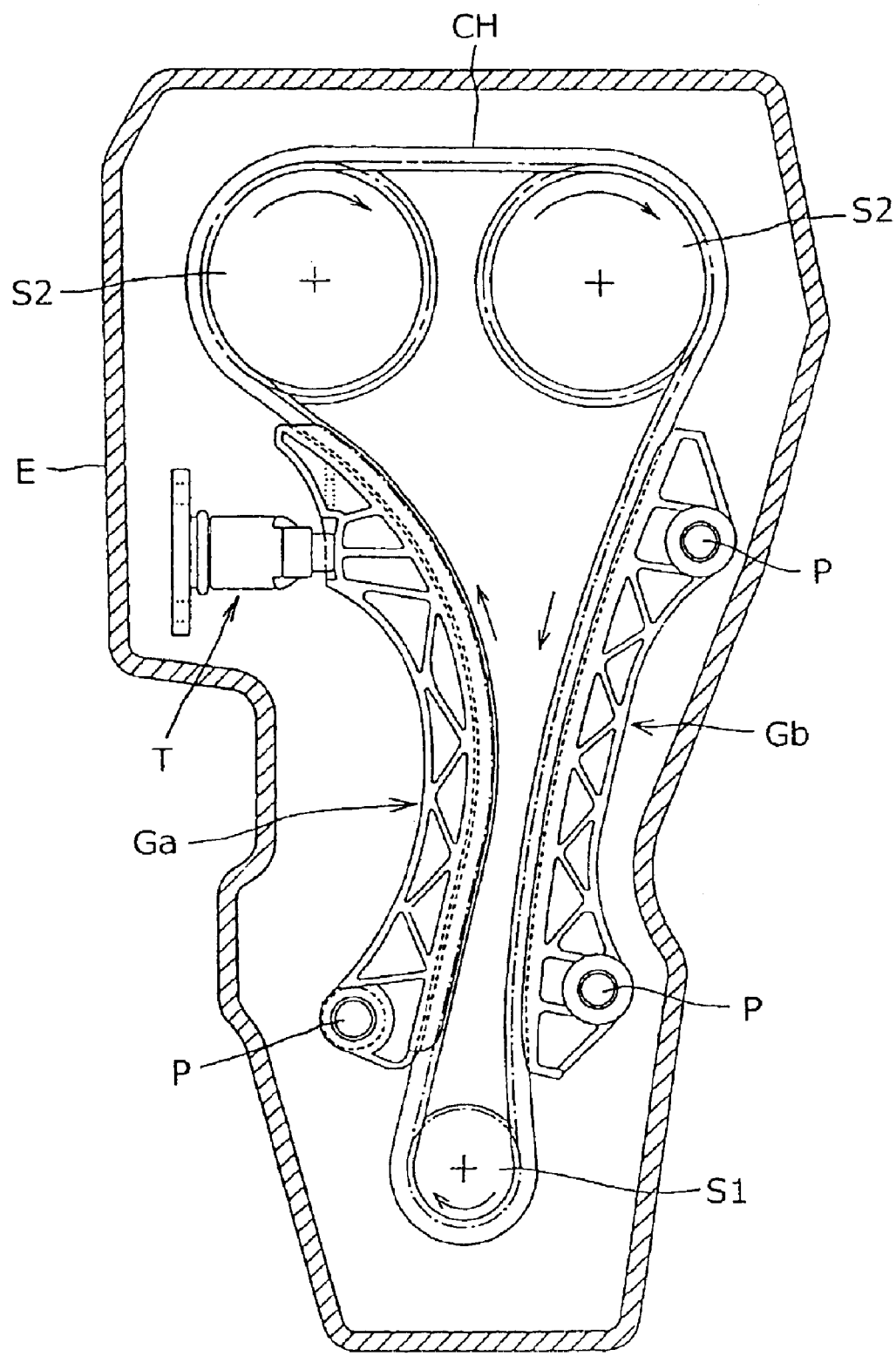
FIG. 7 is an elevational view showing a sliding contact guide mounted in the timing transmission of an internal combustion engine.

The sliding contact guide in accordance with the invention, as shown in FIGS. 1–3, has features in common with the conventional sliding contact guide shown in FIG. 4. Therefore, the last two digits of the three-digit reference numerals in FIGS. 1 to 3 are the same as those of the reference numerals of corresponding parts of the conventional sliding contact guide 300 shown in FIG. 4.

In guide 100, a guide body 110 includes a shoe 110a on the surface of which a traveling transmission medium such as a chain, belt or the like slides. The guide body also includes a plate-receiving portion 110b, provided on the back of the shoe 110a and extending along the longitudinal direction of the guide. The shoe and the plate-receiving portion are integrally molded as a unit from a synthetic resin. A reinforcing plate 120, composed of a rigid material, is inserted and fitted into a slot 110c which has its opening in a face portion of the plate-receiving portion 110b facing away from the shoe 110a. The slot 110c extends along the longitudinal direction of the guide.

A mounting hole 110d adjacent an end of the guide body, and a hole 120a adjacent an end of the reinforcing plate 120, are in register with each other when the plate is properly seated in slot 110c. These holes receive a mounting bolt, a mounting pin, or the like (not shown in FIGS. 1–3), which fastens them together at one end of the guide, and, in the case of a movable guide, serves as a pivot. Ribs 110f are formed on the plate-receiving portion 110b for enhancing the strength of the guide body 110.

Further, the guide body 110 is provided with two windows, and a locking piece 110e is provided in each of these windows. The locking piece is an integrally molded part of the plate-receiving portion of the guide body, and preferably extends in the direction from the face in which the slot opening is situated toward the shoe. The stem of the locking piece is resilient, being capable of bending both into and out of the slot in the directions indicated by the arrow in FIG. 3. The locking piece has resilience, causing it to tend to return to the position shown in FIG. 3. The tip portion of the locking piece 110e has a bulged portion 110g, which enters the slot as shown in FIG. 3. The bulged portion 110g includes a tapered surface 110g facing the shoe 110a. The reinforcing plate 120 is provided with two locking holes 120b positioned to receive the tip portions of the respective locking pieces 110e when the reinforcing plate 120 has been fitted into the guide body 110.

The positions of the tapered surfaces of the locking pieces, and the locking holes in the reinforcing plate are related in such a way that, when the reinforcing plate is inserted and fitted into the slot 110c, the tapered surface of the bulged portion 110g resiliently presses an edge of the locking hole, urging the reinforcing plate toward, and into engagement with, the back of the shoe, that is, into engagement with the top of the slot as seen in FIG. 2. Therefore, the reinforcing plate 120 is always held against the back of the shoe, without a gap being formed between the shoe and the edge of reinforcing plate. The locking piece also presses laterally against the edge of the locking hole in the plate, pressing the plate against the opposite wall of the slot, thereby firmly holding the plate against a side of the slot as well as against the back of the shoe.

Since the locking piece 110e can bend in either direction as indicated by the arrow shown in FIG. 3. Even if the guide body 110 expands or shrinks due to a change in temperature, the bending of the locking piece 110e absorbs the dimensional change in the guide body, and maintains the reinforcing plate 120 in engagement with the back of the shoe and the opposite slot wall.

The engagement of the locking pieces of the guide body with the locking holes in the reinforcing plate reliably secures the locking plate to the guide body, and when vibration of the guide occurs, no noise is generated due to movement of the reinforcing plate in the slot, and no wear is generated due to friction between the reinforcing plate and the guide body. As a result the sliding contact guide in accordance with the invention achieves a significant reduction in noise, and also has a long useful life.

We claim:

1. A sliding contact guide for a flexible transmission medium comprising an elongated synthetic resin guide body and a reinforcing plate, said guide body including a shoe extending along the longitudinal direction of the guide body, said shoe having a front surface arranged to contact a transmission medium, and a back side, and a plate-receiving portion provided on said back side of the shoe and integrally molded as a unit with said shoe, the plate-receiving portion also extending along the longitudinal direction of the guide body and having a slot extending along the longitudinal direction of the guide, said reinforcing plate being fitted in said slot, and said plate-receiving portion having a face spaced from said shoe, and an opening in said face, said opening facing away from said shoe, whereby said reinforcing plate can be inserted into the slot in a direction of insertion transverse to said shoe;

said guide body having a mounting hole adjacent an end thereof, and said reinforcing plate having a hole adjacent an end thereof and in register with said mounting hole, whereby said holes can receive a mounting pin and said guide body and reinforcing plate are held together in part by the engagement of said holes with the mounting pin, a window in said plate-receiving portion, and a locking piece provided in said window, having a tip with a bulged portion entering said slot, and a tapered surface formed on said bulged portion, and a locking hole provided in said reinforcing plate, said reinforcing plate being locked to said guide body by engagement of the tapered surface of said bulged portion with an edge of said locking hole, said tapered surface exerting a biasing force on said edge of the locking hole, urging the reinforcing plate against the back side of said shoe.

2. A sliding contact guide according to claim 1, in which the locking piece extends in a direction from said face of the plate-receiving portion toward said shoe.

\* \* \* \* \*